(12) United States Patent
Zimmerman et al.

(10) Patent No.: US 9,085,002 B2
(45) Date of Patent: Jul. 21, 2015

(54) MODULAR MANIFOLD ADHESIVE GUN

(75) Inventors: Brett J. Zimmerman, Alexandria, MN (US); Timothy P. Hillesheim, West Union, MN (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 13/472,119

(22) Filed: May 15, 2012

(65) Prior Publication Data

US 2012/0292343 A1  Nov. 22, 2012

Related U.S. Application Data

(60) Provisional application No. 61/488,051, filed on May 19, 2011.

(51) Int. Cl.
| | |
|---|---|
| *B67D 7/78* | (2010.01) |
| *B05B 7/04* | (2006.01) |
| *B05B 7/12* | (2006.01) |
| *B05B 12/00* | (2006.01) |
| *B29B 7/74* | (2006.01) |
| *B05C 17/005* | (2006.01) |

(52) U.S. Cl.
CPC .............. *B05B 7/0408* (2013.01); *B05B 7/12* (2013.01); *B05B 12/002* (2013.01); *B29B 7/7438* (2013.01); *B05C 17/00506* (2013.01)

(58) Field of Classification Search
CPC ... B05C 17/00503–17/00509; B05C 17/00516
USPC ............ 222/145.5–145.6, 135–137; 239/304, 239/413–416.1, 417.5, 407, 525, 526, 527
See application file for complete search history.

(56) References Cited

U.S. PATENT DOCUMENTS

| | | | | | |
|---|---|---|---|---|---|
| 1,362,228 | A | * | 12/1920 | Cleveland | 451/102 |
| 1,549,420 | A | * | 8/1925 | Hofstetter | 239/414 |
| 1,704,498 | A | * | 3/1929 | Deming | 239/416.2 |
| 2,245,195 | A | * | 6/1941 | Hopkins | 134/100.1 |

(Continued)

FOREIGN PATENT DOCUMENTS

| | | | |
|---|---|---|---|
| DE | 2318313 | * | 10/1974 |
| DE | 3047095 | * | 7/1982 |

(Continued)

OTHER PUBLICATIONS

International search report for PCT/US2012/038545, dated Oct. 23, 2012.

*Primary Examiner* — Frederick C Nicolas
*Assistant Examiner* — Randall Gruby
(74) *Attorney, Agent, or Firm* — Levenfeld Pearlstein, LLC

(57) ABSTRACT

An applicator gun for a two-part material includes a hand grip and a barrel. The barrel extends generally transverse to the hand grip and has a free end. A feed valve set is positioned at about a juncture of the barrel and the hand grip, and includes first and second feed valves, each having an inlet. An actuator is operably connected to one or both of the feed valves for opening and closing the valves. A mixing nozzle is disposed at the barrel free end and has first and second inlets and discharge openings. The discharge openings are formed at a discharge end of the nozzle. Feed tubes provide flow communication between the feed valves and the mixing nozzle inlets. The actuator opens the feed valves to feed the two part material through the applicator gun and the two-part material is maintained separated through discharge at the mixing nozzle.

20 Claims, 5 Drawing Sheets

(56) References Cited

U.S. PATENT DOCUMENTS

| | | | |
|---|---|---|---|
| 2,635,010 A * | 4/1953 | Sanders et al. | 239/415 |
| 2,674,264 A * | 4/1954 | Nicholas | 366/160.1 |
| 2,842,794 A * | 7/1958 | Lofgren | 15/417 |
| 3,079,090 A * | 2/1963 | Decker | 239/142 |
| 3,596,835 A * | 8/1971 | Smith et al. | 239/394 |
| 3,690,557 A * | 9/1972 | Higgins | 239/112 |
| 3,784,110 A * | 1/1974 | Brooks | 239/304 |
| 3,786,990 A * | 1/1974 | Hagfors | 239/112 |
| 3,837,575 A * | 9/1974 | Lehnert | 239/112 |
| 3,850,371 A * | 11/1974 | Trapp | 239/113 |
| 4,117,551 A | 9/1978 | Brooks et al. | |
| 4,471,887 A * | 9/1984 | Decker | 222/135 |
| 4,609,149 A * | 9/1986 | Jessen | 239/310 |
| 4,708,292 A * | 11/1987 | Gammons | 239/414 |
| 4,773,566 A * | 9/1988 | Hoagland | 222/146.5 |
| 4,871,090 A * | 10/1989 | Hoffmann | 222/81 |
| 4,901,888 A * | 2/1990 | Standlick | 222/145.7 |
| 4,913,317 A * | 4/1990 | Wernicke | 222/1 |
| 4,925,107 A * | 5/1990 | Brown | 239/414 |
| 4,981,241 A * | 1/1991 | Keller | 222/137 |
| 5,020,694 A * | 6/1991 | Pettengill | 222/137 |
| 5,067,515 A * | 11/1991 | Smith | 137/327 |
| 5,116,315 A * | 5/1992 | Capozzi et al. | 604/82 |
| 5,143,296 A * | 9/1992 | Saurwein et al. | 239/415 |
| 5,249,862 A * | 10/1993 | Herold et al. | 366/312 |
| 5,277,256 A * | 1/1994 | Bailey | 169/15 |
| 5,289,949 A * | 3/1994 | Gentile | 222/137 |
| 5,320,288 A * | 6/1994 | Ketcham, Jr. | 239/316 |
| 5,462,204 A * | 10/1995 | Finn | 222/137 |
| 5,462,205 A * | 10/1995 | Keller | 222/145.1 |
| 5,577,654 A * | 11/1996 | Bishop | 227/175.1 |
| 5,609,271 A * | 3/1997 | Keller et al. | 222/145.6 |
| 5,709,317 A * | 1/1998 | Bertram et al. | 222/135 |
| 5,803,312 A * | 9/1998 | Credle et al. | 222/129.1 |
| 5,857,589 A * | 1/1999 | Cline et al. | 222/1 |
| D408,527 S * | 4/1999 | Coelho et al. | D24/108 |
| 5,988,444 A * | 11/1999 | Williams et al. | 222/137 |
| 6,019,251 A * | 2/2000 | Koga | 222/94 |
| 6,021,961 A * | 2/2000 | Brown | 239/398 |
| 6,029,857 A * | 2/2000 | Keller | 222/137 |
| 6,048,201 A * | 4/2000 | Zwingenberger | 433/90 |
| 6,063,223 A * | 5/2000 | Klauke et al. | 156/242 |
| 6,158,624 A * | 12/2000 | Grigg et al. | 222/145.6 |
| 6,223,936 B1 * | 5/2001 | Jeanbourquin | 222/1 |
| 6,244,740 B1 * | 6/2001 | Wagner et al. | 366/181.5 |
| 6,375,096 B1 * | 4/2002 | Rashidi | 239/413 |
| 6,386,293 B1 * | 5/2002 | Bartlett | 169/47 |
| 6,415,958 B1 * | 7/2002 | Donley | 222/146.5 |
| 6,431,468 B1 * | 8/2002 | Brown et al. | 239/526 |
| 6,484,904 B1 * | 11/2002 | Horner et al. | 222/137 |
| 6,523,992 B1 * | 2/2003 | Bublewitz et al. | 366/172.1 |
| 6,769,574 B1 * | 8/2004 | Keller | 222/137 |
| 6,837,398 B2 * | 1/2005 | Rueschhoff et al. | 222/137 |
| 6,840,404 B1 * | 1/2005 | Schultz et al. | 222/61 |
| 6,955,531 B2 * | 10/2005 | Wu | 417/571 |
| 7,044,402 B2 * | 5/2006 | Finn | 239/302 |
| 7,267,288 B2 * | 9/2007 | Wheeler et al. | 239/398 |
| 7,407,117 B2 * | 8/2008 | Dodd | 239/310 |
| 7,481,332 B2 * | 1/2009 | Ollmann et al. | 222/135 |
| 7,631,782 B2 * | 12/2009 | Engelbrecht et al. | 222/145.6 |
| 7,753,245 B2 * | 7/2010 | Boudreaux et al. | 227/175.1 |
| 7,837,656 B2 * | 11/2010 | Tarinelli | 604/191 |
| 8,033,429 B2 * | 10/2011 | Keller | 222/145.6 |
| 8,047,407 B2 * | 11/2011 | Wheeler et al. | 222/287 |
| 8,276,611 B2 * | 10/2012 | Swab et al. | 137/501 |
| 8,387,899 B2 * | 3/2013 | Fortier et al. | 239/399 |
| 8,608,091 B2 * | 12/2013 | Murray et al. | 239/414 |
| 2005/0274822 A1 * | 12/2005 | Lyons | 239/310 |
| 2005/0279280 A1 * | 12/2005 | Bhatia | 118/300 |
| 2006/0208000 A1 * | 9/2006 | Murray et al. | 222/135 |
| 2007/0009607 A1 * | 1/2007 | Jones | 424/522 |
| 2007/0012724 A1 * | 1/2007 | Feinberg et al. | 222/137 |
| 2008/0267005 A1 * | 10/2008 | Reinprecht | 366/162.3 |
| 2009/0127280 A1 * | 5/2009 | Kieft | 222/1 |
| 2010/0270332 A1 * | 10/2010 | Trout | 222/145.1 |
| 2010/0270400 A1 * | 10/2010 | Evar et al. | 239/414 |
| 2011/0031270 A1 * | 2/2011 | Choiniere et al. | 222/1 |
| 2011/0198370 A1 * | 8/2011 | Ho et al. | 222/137 |
| 2012/0168463 A1 * | 7/2012 | Hanai et al. | 222/135 |
| 2014/0117044 A1 * | 5/2014 | Pappalardo | 222/137 |

FOREIGN PATENT DOCUMENTS

| | | | |
|---|---|---|---|
| DE | 2366518 | * | 9/1987 |
| EP | 0749399 | * | 2/2000 |
| EP | 1745856 | * | 1/2007 |
| JP | 2736528 | * | 4/1998 |
| SU | 582846 | * | 12/1977 |
| WO | 0236481 | * | 5/2002 |
| WO | 03066227 A1 | | 8/2003 |

* cited by examiner

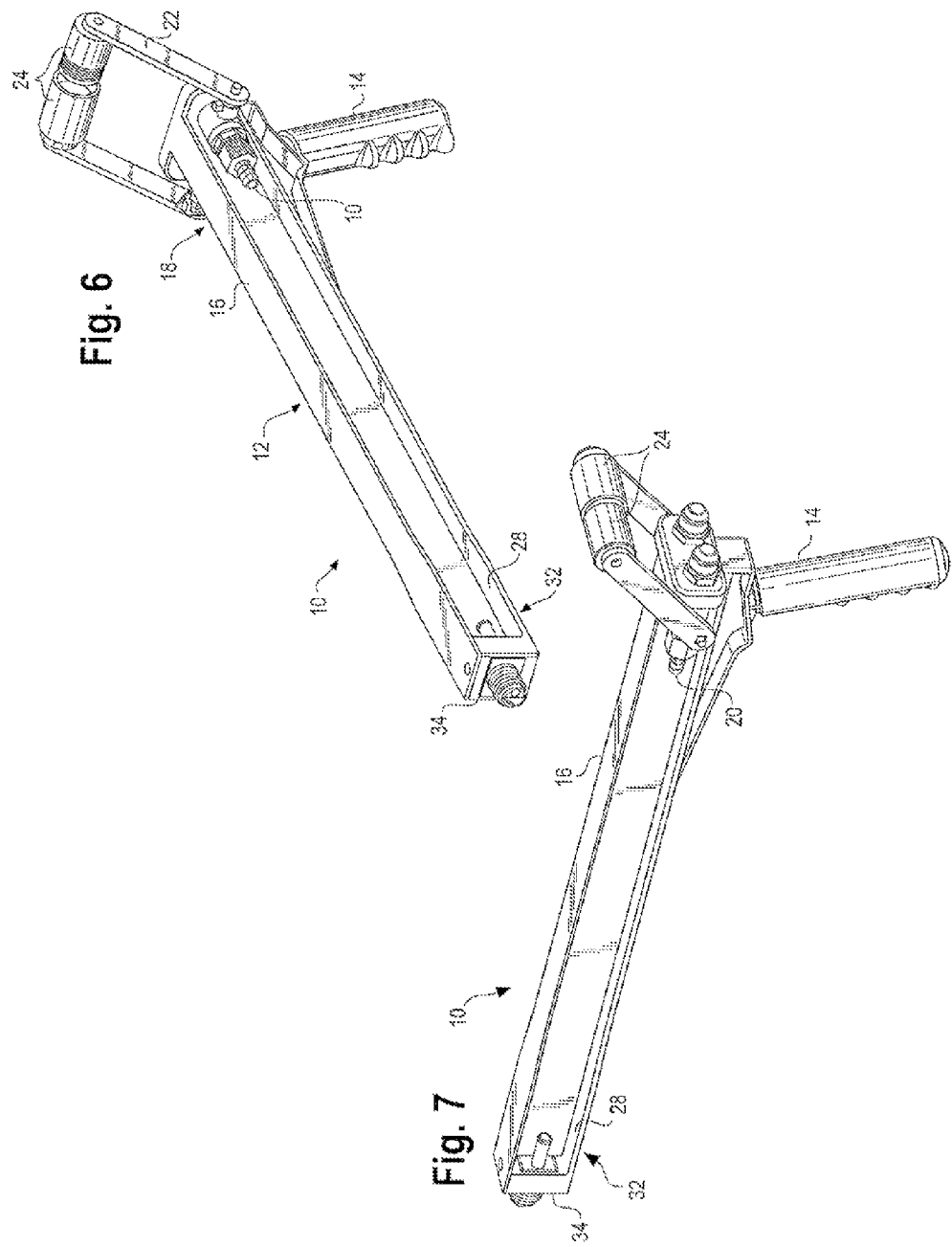

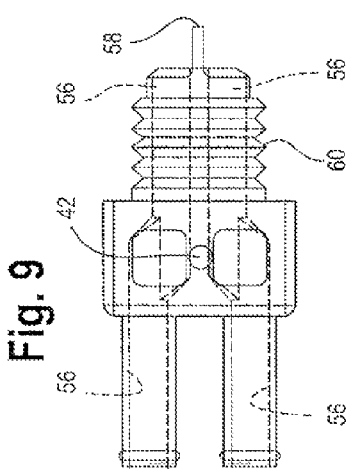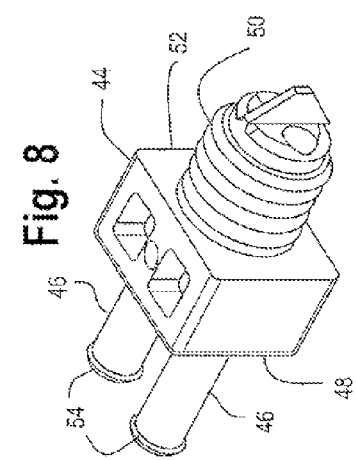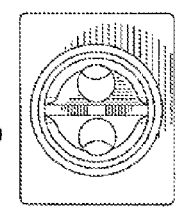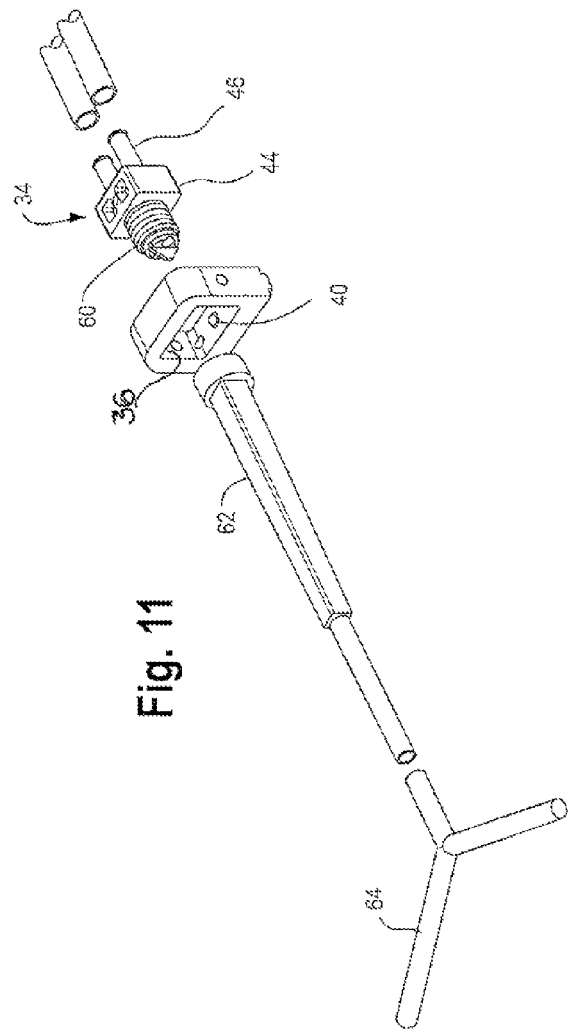

MODULAR MANIFOLD ADHESIVE GUN

CROSS-REFERENCE TO RELATED APPLICATION DATA

This application claims the benefit of priority of U.S. Provisional Patent Application Ser. No. 61/488,051, filed May 19, 2011, the disclosure of which is incorporated herein in its entirety.

BACKGROUND

Many known adhesives are applied in two-part form. For example, epoxy adhesives are provided in a two-part form as a resin and an accelerator. When mixed, the accelerator facilitates the setting (or hardening or curing) of the resin.

In large scale applications, such as those for installing roofing materials and the like, the two parts, the resin and the accelerator, are carried in containers on a cart. A pump conveys the materials to an applicator gun. Known applicator guns include a frame with a barrel and handle. A manifold block, such as a steel or aluminum block is mounted at the end of the barrel.

Tubes or hoses are used as the conduit to convey material from the pumps to the manifold block. Valves are mounted to the block (typically ball valves) that are used to permit and shut-off flow of material into the manifold block. The two valves are separately actuated.

A mixing nozzle is bolted to the end of the manifold block and an applicator tube is mounted, as by threading, onto the end of the mixing nozzle. As such, mixing of the resin and accelerator occurs, in part, at the end of the manifold block and in the mixing nozzle.

There are a number of drawbacks with the present applicator system. First, the equipment is heavy and unwieldy. In particular, the manifold block is, as the name describes, a block. It is typically a block of steel or aluminum and is positioned at the end of the barrel, with the valves (also steel or aluminum) mounted to the block. Thus the majority of the weight of the gun is located at a distance from the user's hand that is holding the gun, creating a fairly substantial moment at the hand and wrist.

Moreover, in that mixing occurs at the end or exit of the manifold and in the mixing nozzle, if delivery of either or both of the components of the two-part adhesive is upset, the mixed adhesive can set up in the manifold block and/or the mixing nozzle. When this happens, it is necessary to take the applicator gun out of service, remove the mixing nozzle and clean and/or replace the manifold block and mixing nozzle. This can be a time consuming and costly situation in the cleaning and or replacement service and lost applicator operating time.

Accordingly, there is a need for an applicator gun and system that is light-weight and readily maneuvered. Desirably, such an applicator gun uses a single or double valve actuator to open and close both the resin and the accelerator valves. More desirably still, the actuator is located at or near the juncture of the gun barrel and handle, near the user's hand, to provide better ergonomics and ease of use. Still more desirably, the applicator gun includes a modular mixing nozzle and carriage to facilitate quick change-out as needed.

SUMMARY

An applicator gun applies a two-part material. The gun includes a hand grip and a barrel extending from an end of the hand grip, generally transverse to the hand grip. The barrel has a free end.

A feed valve set is positioned at about a juncture of the barrel and the hand grip. The feed valve set includes first and second feed valves, each of which has an inlet. An actuator is operably connected to the feed valves for opening and closing the feed valves.

A mixing nozzle is disposed at about the free end of the barrel. The mixing nozzle has first and second inlets and first and second discharge openings. The discharge openings are formed at a discharge end of the nozzle. First and second feed tubes provide flow communication between the second feed valves and the mixing nozzle inlets.

The actuator opens the feed valves contemporaneously to feed the two part material through the applicator gun. The two-part material is maintained separated through discharge at the mixing nozzle. A separator can be positioned between the first and second discharge openings.

The barrel can include channels formed therein for receipt of the first and second feed tubes.

The mixing nozzle is secured in the barrel by a biased detent. The detent can be located in the mixing nozzle and the barrel can include a recess for cooperating with the biased detent. Alternately, the detent can be located in the barrel and the mixing nozzle can includes a recess for cooperating with the detent.

The mixing nozzle can include a cooperating member, such as a thread or a bayonet mount for mounting a mixing tip to the nozzle.

In an embodiment, the hand grip and barrel are formed as a unitary member. They can be formed from polymeric materials or the like and can be a molded component or components. Preferably, the mixing nozzle is also formed from a polymeric material.

These and other features and advantages of the present invention will be readily apparent from the following detailed description, in conjunction with the claims.

BRIEF DESCRIPTION OF THE DRAWINGS

FIG. 6 is a perspective view of the applicator gun frame;

FIG. 7 is a perspective view of the applicator gun frame assembled, with the feed hoses shown disconnected from the feed valves;

FIG. 8 is a partial bottom view of the applicator gun frame;

FIG. 9 is a perspective view of the mixing nozzle;

FIG. 10 is a top view of the mixing nozzle; and

FIG. 11 is a front view of the mixing nozzle.

DETAILED DESCRIPTION

Figure 1:
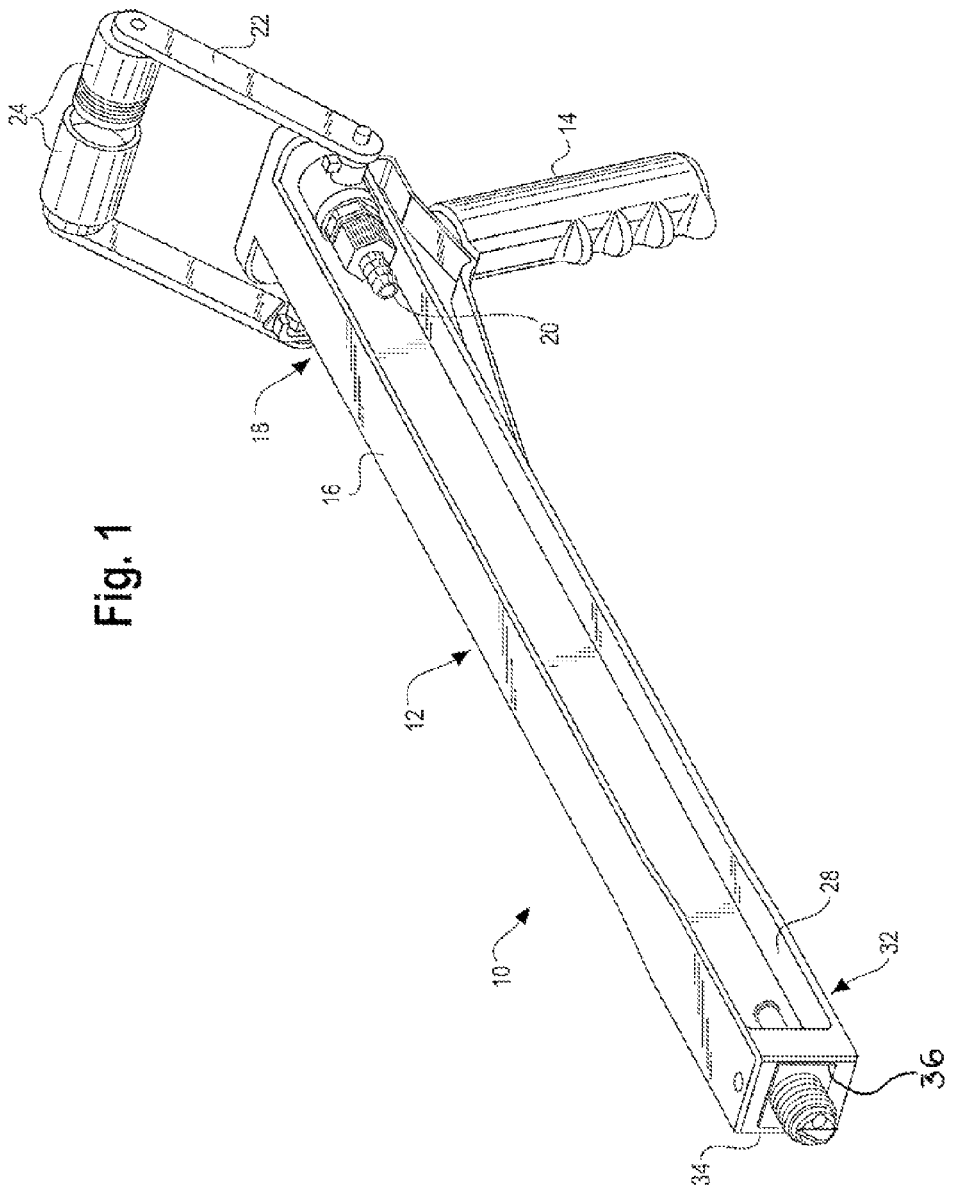
FIG. 1 is a perspective illustration of an embodiment of an applicator gun, in which the feed hoses are shown disconnected from the feed valves for clarity of illustration.

While the present device is susceptible of embodiments in various forms, there is shown in the drawings and will hereinafter be described exemplary and non-limiting embodiments, with the understanding that the present disclosure is to be considered an exemplification of the device and is not intended to be limited to the specific embodiments illustrated.

Figure 2:
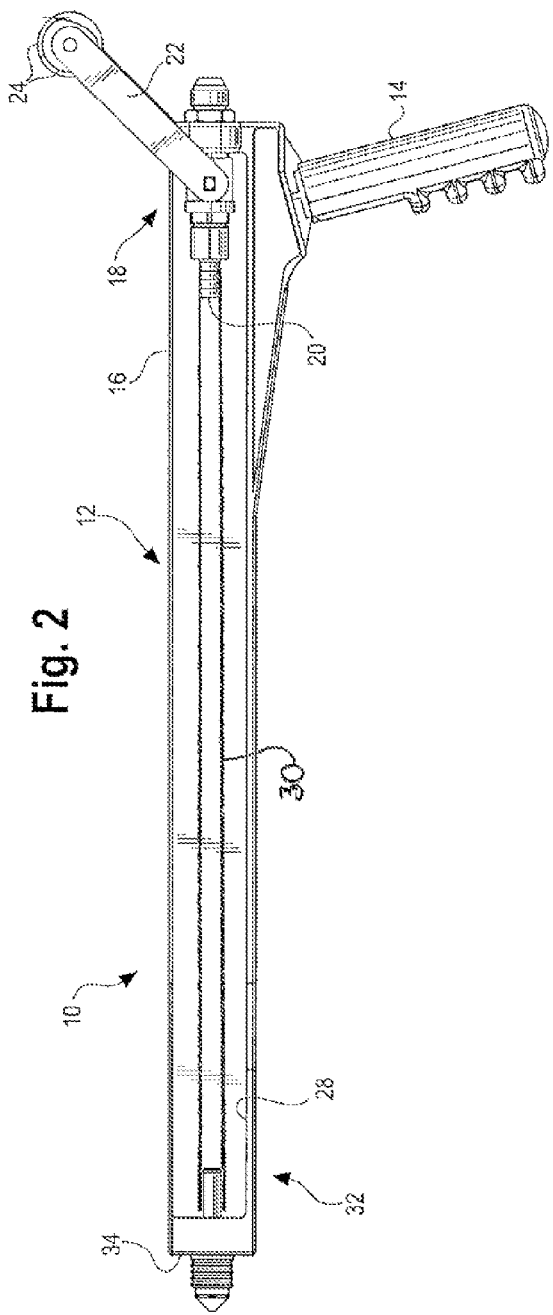
FIG. 2 is a side view of the applicator gun of FIG. 1.
Figure 3:
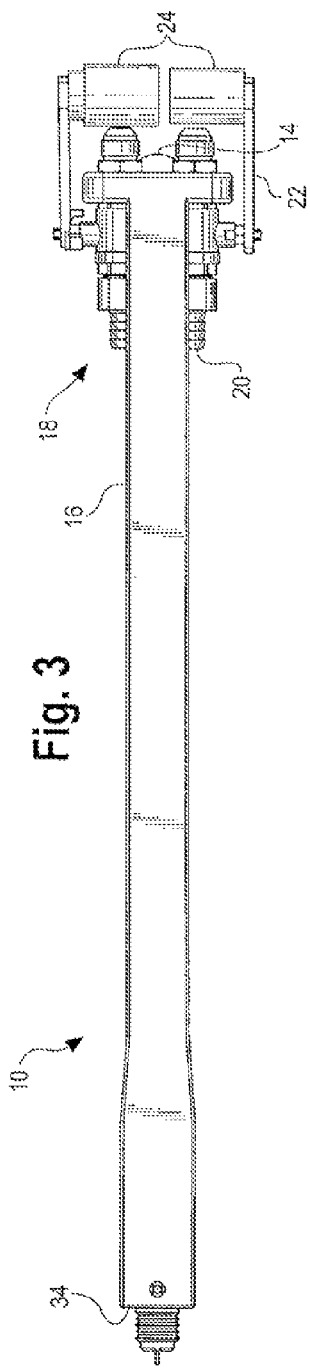
FIG. 3 is a top view of the applicator gun.
Figure 4:
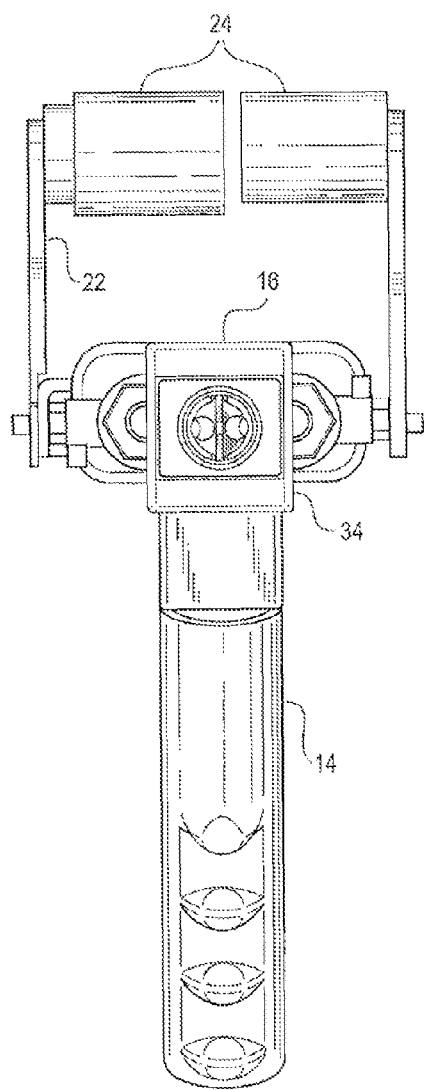
FIG. 4 is a rear view of the applicator gun, as viewed looking into the feed valves.
Figure 5:
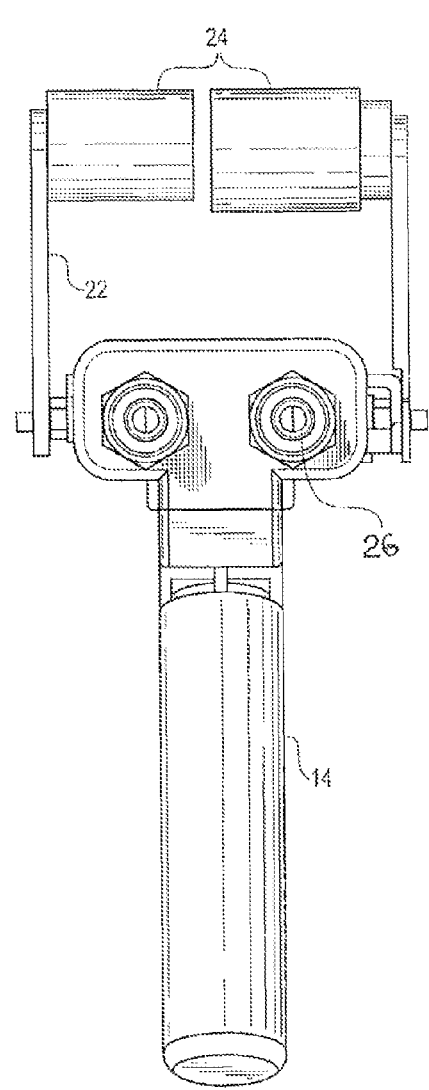
FIG. 5 is a front view of the applicator gun, as viewed looking into the mixing nozzle.

With reference now to the figures and in particular to FIGS. 1-5, an applicator gun 10 is shown. The applicator gun 10 includes a frame 12 having a handle 14 and a barrel 16. The handle 14 is formed transverse to the barrel 16. The barrel 16 has a first end 18, at about the handle, that is configured to accommodate and secure first and second feed valves 20 to the frame 12. An actuator handle 22 is mounted to each valve 20 to open and close the valve 20. The valves can be opened in tandem or independently. A hand grip 24, such as the tubular handle can be mounted to each actuator handle 22 to facilitate ease of opening and closing the valves 20. Although two hand grips 24 are shown, it will be appreciated that a single hand grip can be used to actuate the valves concurrently. The valves 20 each include an inlet 26, to which delivery hoses (not shown) are affixed to feed the resin and accelerator to the applicator gun 10. The valves 20 can be mounted to the frame 12 by methods that will be recognized by those skilled in the art.

The frame 12 includes a longitudinal channel 28 formed in each side. The channels 28 are configured to accommodate feed tubes 30 that extend from the feed valves 20 to the end 32 of the barrel 16. A mixing nozzle 34 is positioned in and secured to a recess or opening 36 in the end of the barrel.

The mixing nozzle 34 is mounted to the barrel 16 and is captured by the walls 38 that define the opening 36. As best seen in FIGS. 8 and 11, a biased bearing 40 (ball or plug) serves as a detent to maintain the mixing nozzle 34 in the opening 36. As illustrated, the bearing 40 and a spring (not shown) are located within the bottom wall 38a of the opening 36, such that the ball 40 (which is urged upward, into the opening 36 by the spring), engages a recess or dimple 42 in the top of the mixing nozzle 34. It will be appreciated be those skilled in the art that the bearing 40 detent can be located in the top wall of the opening 36, or can be positioned in the mixing nozzle (described below) and that the recess or dimple can be located in the frame 12. This arrangement provides a tool-less arrangement by which the mixing nozzle 34 can be installed in and removed from the frame 12 (opening 36) while still maintaining the nozzle 34 sufficiently secure within the frame 12 for proper functioning of the applicator gun 10.

Referring to FIGS. 8-11, the mixing nozzle 34 includes a body 44 having a pair of inlet tubes 46 extending from one end 48 of the body 44 to a discharge nozzle 50 at an opposite end 52 of the body 44. In a present mixing nozzle 34, the inlet tubes 46 have a friction fit (such as the raised ring 54), so that the feed tubes 30 (which are inserted onto the inlet tubes 46), remain secured to the inlet tubes 46. Other arrangements for securing the feed tubes 30 to the inlet tubes 46, such as barbed fittings and the like, are contemplated and are within the scope and spirit of the present disclosure.

As discussed above, the body 44 includes the recess or dimple 42 for receiving the bearing detent 40 (in the frame 12) to secure the mixing nozzle 34 within the frame end opening 36. Also as discussed above, the bearing detent 40 can be positioned in the mixing nozzle body 44 to cooperate with a recess or dimple in the frame 12.

Within the body 44 of the mixing nozzle 34, two flow chambers 56 are formed. Each flow chamber 56 extends from a respective inlet tube 46, through the body 44, toward and into the discharge nozzle 50. The chambers 56 converge at the (discharge) end of the discharge nozzle 50. A separator 58 is positioned on the end of the discharge nozzle 50, between the flow chamber 56 ends (exit ends) to prevent contamination at the respective flow chamber 56 ends. That is, the separator 58 prevents resin from entering or coming into contact with the accelerator flow chamber end, and likewise, the separator 58 prevents accelerator from coming into contact with resin at the resin flow chamber end. This configuration reduces or eliminates premature mixing of the resin and accelerator at the mixing nozzle by maintaining the two parts separate from one another. In a present mixing nozzle 34, the separator 58 is formed as a wall between the two flow chamber 56 ends.

Referring to FIG. 11, the discharge end 50 of the mixing nozzle 34 can include a thread 60 or like formation to permit the use (e.g., connection) of a mixing tip 62. A Y-adapter 64 can be fitted onto the mixing tip 62 to permit applying two beads of adhesive simultaneous. The mixing tip 62 can include an internal element (not shown), such as a screw thread or the like, to enhance intimate mixing of the resin and accelerator as they flow though the tip 62. It is contemplated that the mixing tip 62 can be readily replaced in the event that the adhesive sets up in the tip 62.

A present applicator gun 10 is formed from common, relatively light-weight materials. For example, the frame 12 can be formed from a polymeric material such as high density polyethylene (HDPE). HDPE is ideal due to its strength, stability and workability/formability. The valves 20 and handle/actuator 22 can be formed from steel, aluminum or like metals. However, because the valves 20 and handle/actuator 22 are located near the hand grip 24, the weight of these components is readily managed. The feed tubes 30 can be formed from any polymeric material that is suitable or compatible with the resin and accelerator. The tubes 30 can be transparent or translucent so that material in the tubes 30 can be readily, visibly inspected. The tubes 30 may also be color coded, as by striping, so that the resin and accelerator are fed through the same tubes 30 (for example when changing over supplies) to prevent contamination of the tubes 30. The mixing nozzle 34 is also preferably formed from a molded, polymeric material. Other suitable materials for the various components of the applicator gun 10 will be recognized by those skilled in the art.

In the disclosure, the use of the disjunctive is intended to include the conjunctive. The use of the definite article or indefinite article is not intended to indicate cardinality. In particular, a reference to "the" object or "a" or "an" object is intended to denote also one of a possible plurality of such objects.

All patents referred to herein, are hereby incorporated herein by reference, whether or not specifically done so within the text of this disclosure.

From the foregoing it will be observed that numerous modification and variations can be effectuated without departing from the true spirit and scope of the novel concepts of the present disclosure. It is to be understood that no limitation with respect to the specific embodiments illustrated is intended or should be inferred. The disclosure is intended to cover by the appended claims all such modifications as fall within the scope of the claims.

What is claimed is:

1. An applicator gun for applying a two-part material, comprising:

a hand grip;

a barrel extending from an end of the hand grip, the barrel extending generally transverse to the hand grip, the barrel having a free end;

a feed valve set positioned at a juncture of the barrel and the hand grip, the feed valve set including first and second feed valves, each of the first and second feed valves having an inlet;

at least one actuator pivotably mounted to the first and second feed valves with a pivot pin extending along a pivot axis for opening and closing the feed valves to control flow of a first part of the two-part material at the first feed valve and a second part of the two-part material at the second feed valve, the pivot axis extending through and fixed relative to the first feed valve and the second feed valve;

a mixing nozzle disposed at about the free end of the barrel, the mixing nozzle having first and second inlets and first and second discharge openings, the discharge openings formed at a discharge end of the mixing nozzle, the mixing nozzle including a separator positioned between and extending axially outward from the first and second discharge openings; and first and second feed tubes for providing flow communication between the first and second feed valves and the mixing nozzle first and second inlets, respectively, wherein the at least one actuator opens at least one of the first and second feed valves to feed at least one of the first part and second part of the two part material through the applicator gun, the first part and the second part of the two-part material being maintained separated through discharge at the discharge openings of the mixing nozzle, wherein the barrel includes first and second open, outwardly facing channels, wherein the first feed tube is positioned in the first channel and the second feed tube is positioned in the second channel.

2. The applicator gun of claim 1 wherein the barrel includes channels formed therein for receipt of the first and second feed tubes.

3. The application gun of claim 1 wherein the mixing nozzle is secured in the barrel by a biased detent.

4. The applicator gun of claim 3 wherein the biased detent is located in the mixing nozzle and wherein the barrel includes a recess for cooperating with the biased detent.

5. The applicator gun of claim 3 wherein the biased detent is located in the barrel and wherein the mixing nozzle includes a recess for cooperating with the biased detent.

6. The applicator gun of claim 1 wherein the mixing nozzle includes a cooperating member for mounting a mixing tip.

7. The applicator gun of claim 1 wherein the hand grip and barrel are formed as a unitary member.

8. The applicator gun of claim 1 wherein the hand grip and barrel are formed from a polymeric material.

9. The applicator gun of claim 1 wherein the mixing nozzle is formed from a polymeric material.

10. The applicator gun of claim 1 wherein the at least one actuator includes a first actuator connected to the first feed valve and a second actuator connected to the second feed valve.

11. The applicator gun of claim 1 wherein the at least one actuator includes first and second actuators, and the first and second actuators respectively operate the first and second feed valves independently.

12. The applicator gun of claim 1, wherein the barrel includes a first longitudinal side and a second longitudinal side oppositely positioned from the first longitudinal side, wherein the hand grip extends from the first longitudinal side and the at least one actuator is pivotably mounted so as to move through an arc that extends at least partially over the second side.

13. The applicator gun of claim 1, wherein the at least one actuator is pivotably mounted at a position that is external and laterally spaced from the barrel.

14. The applicator gun of claim 1, wherein the mixing nozzle further includes a mixing tip disposed at the discharge end and configured to allow mixing of fluids discharged from the first and second discharge openings.

15. An applicator gun for applying a two-part material comprising:

a barrel having a free end, wherein the barrel includes first and second open, outwardly facing channels, wherein a first feed tube is positioned in the first channel and a second feed tube is positioned in the second channel;

a mixing nozzle comprising:
a body;
first and second inlet tubes projecting externally from one end of the body, each inlet tube defining having an inlet opening formed therein that extends completely across a diameter of the respective inlet tube, such that each inlet opening is uninterrupted across the diameter of the respective inlet tube;

a discharge nozzle extending from an opposite end of the body, the discharge nozzle having first and second discharge openings, the discharge openings formed at a discharge end of the mixing nozzle;

one of a biased detent and a detent cooperating member formed in the body for securing the mixing nozzle at the free end of the barrel without the use of tools; and a separator at about the discharge end and extending axially outward from the discharge end to maintain the first and second discharge openings isolated from one another.

16. The applicator gun of claim 15 wherein the mixing nozzle is a molded part formed from polymeric materials.

17. The applicator gun of claim 15 wherein the separator is a separator wall.

18. The applicator gun of claim 15 including a thread formation at the discharge end.

19. The applicator gun of claim 15 wherein the biased detent is positioned in the mixing nozzle.

20. The applicator gun of claim 15 wherein the detent cooperating member is positioned in the mixing nozzle.

* * * * *